(12) United States Patent
Christman

(10) Patent No.: US 10,550,510 B2
(45) Date of Patent: Feb. 4, 2020

(54) BONE COVER WRAP FOR PACKAGING BONE-IN MEAT PRODUCTS

(71) Applicant: TRIUNE ENTERPRISES, INC., Gardena, CA (US)

(72) Inventor: John Christman, San Pedro, CA (US)

(73) Assignee: TRIUNE ENTERPRISES, INC., Gardena, CA (US)

( * ) Notice: Subject to any disclaimer, the term of this patent is extended or adjusted under 35 U.S.C. 154(b) by 739 days.

(21) Appl. No.: 15/162,799

(22) Filed: May 24, 2016

(65) Prior Publication Data

US 2016/0355311 A1    Dec. 8, 2016

Related U.S. Application Data

(60) Provisional application No. 62/170,770, filed on Jun. 4, 2015.

(51) Int. Cl.
  *B65D 65/14*  (2006.01)
  *A23B 4/10*   (2006.01)
  *D06M 13/02*  (2006.01)

(52) U.S. Cl.
  CPC .......... *D06M 13/02* (2013.01); *A23B 4/10* (2013.01); *B65D 2275/02* (2013.01)

(58) Field of Classification Search
  CPC ...... D06M 13/02; A23B 4/10; B65D 2275/02; B65D 81/28; B65D 81/24
  USPC .......................................................... 53/449
  See application file for complete search history.

(56) References Cited

U.S. PATENT DOCUMENTS

| | | | |
|---|---|---|---|
| 2,606,120 A * | 8/1952 | Cherepow ............ | A23C 19/166 229/87.08 |
| 2,927,865 A | 3/1960 | Lewis, Jr. et al. | |
| 2,944,918 A * | 7/1960 | Nagel ...................... | C08J 7/047 428/341 |
| 2,967,817 A | 1/1961 | Marple, Jr. et al. | |
| 3,003,982 A | 10/1961 | Lindsey | |
| 3,023,156 A * | 2/1962 | Podlipnik .............. | D21H 19/18 106/270 |

(Continued)

FOREIGN PATENT DOCUMENTS

| GB | 1208641 A | 10/1970 |
|---|---|---|
| GB | 1408177 A | 10/1975 |

(Continued)

OTHER PUBLICATIONS

Bunzl Clarity™ Waxed Bone Guard Vacuum Pouches, https://www.bunzlpd.com/product.php?productid=421363cat=0&page=1, Copyright 2009.

*Primary Examiner* — Nathaniel C Chukwurah
*Assistant Examiner* — Lucas E. A. Palmer
(74) *Attorney, Agent, or Firm* — Jacob M. Ward; Ward Law Office LLC

(57) ABSTRACT

A method for packaging bone-in meat products using a self-adhesive bone cover wrap includes impregnating a non-woven polypropylene layer with a wax formulation. Microcrystalline wax, propylene glycol, and paraffin wax are combined to create the wax formulation. The self-adhesive bone cover wrap is particularly suitable for covering bone-in meat products including covering outwardly extending bones with the non-woven polypropylene layer precluding puncture of the bone cover wrap by the bones and self-adhering to itself to seal the meat product within.

17 Claims, 4 Drawing Sheets

(56) References Cited

U.S. PATENT DOCUMENTS

| | | | | |
|---|---|---|---|---|
| 3,297,610 | A | * | 1/1967 | Moyer ................ C09D 191/08 106/270 |
| 3,417,040 | A | * | 12/1968 | Kremer ................ C08L 91/08 428/440 |
| 3,559,800 | A | * | 2/1971 | Butler ................ B65D 31/02 383/208 |
| 3,629,171 | A | * | 12/1971 | Kremer ................ C09D 123/08 428/484.1 |
| 3,953,557 | A | | 4/1976 | Brax et al. |
| 4,029,822 | A | * | 6/1977 | Comer ................ B65D 77/003 206/497 |
| 4,031,162 | A | | 6/1977 | Brax et al. |
| 4,082,829 | A | | 4/1978 | Brax et al. |
| 4,101,711 | A | * | 7/1978 | Stillman ................ B32B 27/12 428/35.2 |
| 4,136,203 | A | * | 1/1979 | Murphy ................ B65B 25/065 206/523 |
| 4,136,205 | A | * | 1/1979 | Quattlebaum ........ B65B 25/065 206/497 |
| 4,278,738 | A | | 7/1981 | Brax et al. |
| 4,534,984 | A | * | 8/1985 | Kuehne ................ B65B 31/024 383/109 |
| 4,770,731 | A | * | 9/1988 | Ferguson ................ B32B 27/32 156/229 |
| 4,777,095 | A | | 10/1988 | Kondo et al. |
| 4,826,714 | A | * | 5/1989 | King ................ D21H 23/68 229/5.85 |
| 4,915,971 | A | * | 4/1990 | Fennema ................ A23B 4/10 426/138 |
| 4,935,276 | A | * | 6/1990 | Pawlowski ........ B65D 81/264 426/107 |
| 5,064,698 | A | * | 11/1991 | Courtright ........ B65D 51/244 426/124 |
| 5,236,728 | A | * | 8/1993 | Locke ................ B65B 55/20 206/521 |
| 5,296,304 | A | | 3/1994 | Yazaki et al. |
| 5,302,402 | A | * | 4/1994 | Dudenhoeffer ....... B65B 25/065 383/112 |
| 5,362,500 | A | * | 11/1994 | Mazurek ................ A23G 4/00 426/410 |
| 5,480,693 | A | * | 1/1996 | Patterson ................ B32B 7/14 428/36.7 |
| 5,539,035 | A | * | 7/1996 | Fuller ................ C08K 5/09 524/300 |
| 5,543,164 | A | * | 8/1996 | Krochta ................ A21D 15/08 426/102 |
| 5,865,926 | A | * | 2/1999 | Wu ................ B29C 55/18 156/229 |
| 6,007,666 | A | * | 12/1999 | Bunch ................ B32B 29/00 156/280 |
| 6,230,890 | B1 | | 5/2001 | Waver et al. |
| 6,416,620 | B1 | | 7/2002 | Narancic et al. |
| 6,579,584 | B1 | | 6/2003 | Compton |
| 7,018,719 | B2 | | 3/2006 | Ueyama et al. |
| 8,012,520 | B2 | | 9/2011 | Wofford et al. |
| 9,243,162 | B1 | * | 1/2016 | Agrawal ................ D21H 19/40 |
| 10,093,836 | B2 | * | 10/2018 | Christman ............ D06M 15/71 |
| 2002/0114847 | A1 | * | 8/2002 | Peshoff ................ A61K 31/43 424/642 |
| 2003/0124316 | A1 | * | 7/2003 | Huang ................ B32B 29/08 428/182 |
| 2004/0043167 | A1 | * | 3/2004 | Holzem ................ B65D 31/02 428/34.9 |
| 2004/0067356 | A1 | * | 4/2004 | Hakansson .......... B41M 5/5218 428/325 |
| 2004/0069157 | A1 | * | 4/2004 | Lin ................ B65D 33/01 99/451 |
| 2004/0103989 | A1 | * | 6/2004 | Lin ................ B32B 3/266 156/309.6 |
| 2004/0243080 | A1 | | 12/2004 | Baer |
| 2006/0003062 | A1 | * | 1/2006 | Paviot ................ B65D 81/18 426/397 |
| 2007/0014947 | A1 | * | 1/2007 | Mengel ................ A23B 4/10 428/34.1 |
| 2007/0110854 | A1 | * | 5/2007 | Bagley ................ A23L 3/3508 426/106 |
| 2007/0166438 | A1 | * | 7/2007 | Kitahata ................ B01J 20/103 426/242 |
| 2008/0182053 | A1 | * | 7/2008 | Broadus ................ B32B 27/34 428/34.9 |
| 2009/0022978 | A1 | * | 1/2009 | Wuu ................ C09D 191/06 428/323 |
| 2009/0274799 | A1 | * | 11/2009 | Lee ................ A21C 9/04 426/107 |
| 2010/0139877 | A1 | | 6/2010 | Black et al. |
| 2012/0107511 | A1 | * | 5/2012 | Luu ................ D21H 17/06 427/395 |
| 2013/0092724 | A1 | | 4/2013 | Gaynor et al. |
| 2013/0330516 | A1 | | 12/2013 | Pedoja |

FOREIGN PATENT DOCUMENTS

| | | |
|---|---|---|
| WO | 9000137 A1 | 1/1990 |
| WO | 2007149276 A2 | 12/2007 |

\* cited by examiner

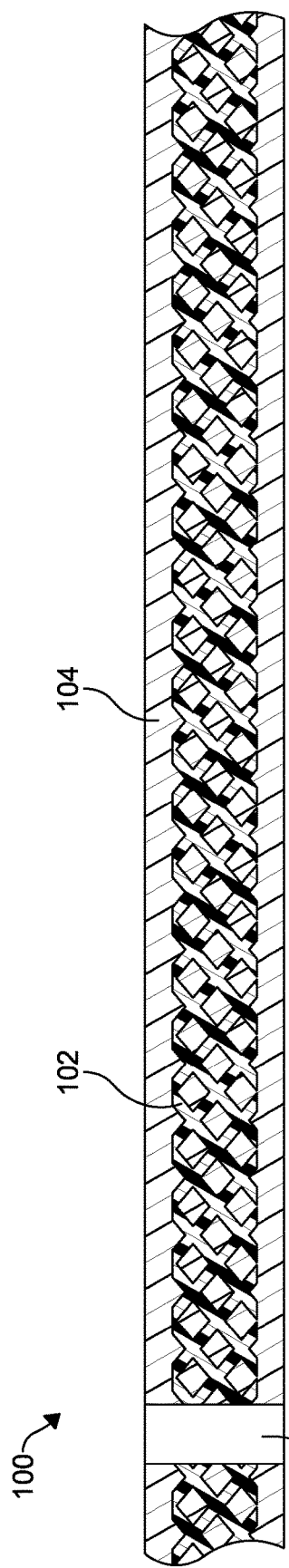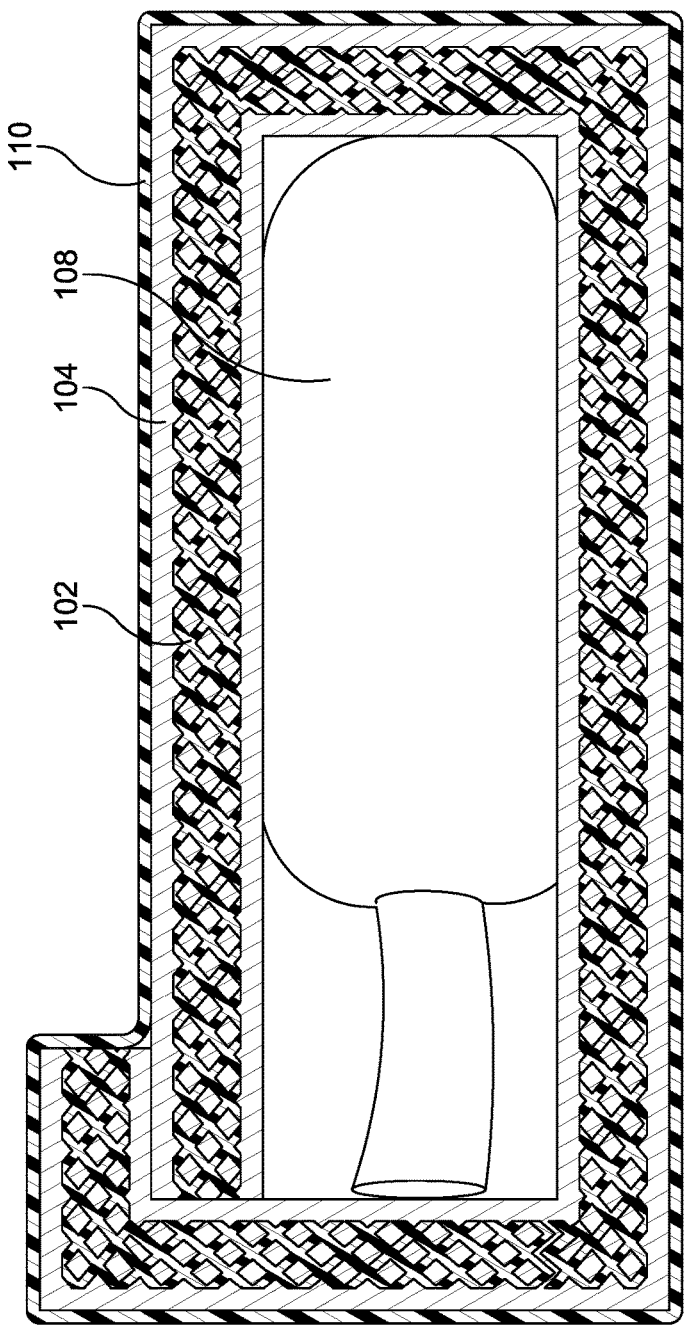

BONE COVER WRAP FOR PACKAGING BONE-IN MEAT PRODUCTS

CROSS REFERENCE TO RELATED APPLICATIONS

This application claims the benefit of U.S. Provisional Application Ser. No. 62/170,770, filed on Jun. 4, 2015. The entire disclosure of the above application is hereby incorporated herein by reference.

FIELD

The present disclosure relates to packaging materials for food products such as meat products and, more particularly, to a self-adhesive wrap for protecting meat and preventing puncture by sharp objects such as bones prior to application of a shrink or vacuum bag.

BACKGROUND

In the meat industry, it is necessary to package or wrap bulk meat cuts to prevent drying, to prevent or minimize exposure to contamination, and to prevent exposure to air and to retain meat fluids. A frequent problem is the storage or shipment of bone-in meat cuts containing exposed sharp edges of bone that contact the sheet or material used to cover the meat.

Bone-in meat cuts frequently have exposed bone portions that may be sharp enough to cut through known wrapping materials, thereby degrading the wrap effectiveness. It is therefore known practice to apply a plastic meat plug or individual bone cover directly to exposed bone surfaces prior to application of a separate meat wrap, vacuum bag, or shrink fit bag. The bone plugs are commonly a synthetic resin material, and the bone covers are commonly a woven cloth. Many of the known bone covers are made of flexible material to further reduce the risk of puncturing or abrading the meat wrapping material by friction with the bone cover. This practice therefore requires the time and expense of storing and applying the bone covers as an independent step in the meat wrapping process, thereby incurring an undesirable increased cost to the process.

It is also a known practice to use a thicker walled bag or shrink wrap to accommodate sharp boned meat products.

There is a continuing need for a wrap product that minimizes puncture by sharp items such as bone present in bulk or bone-in meat products during transportation, storage, and during sales presentation, while eliminating the need for a separate bone cover. Desirably, the wrap product can be used with a variety of meats and can be used on meat items having irregular shapes.

SUMMARY

In concordance with the instant disclosure, a method for packaging bone-in meat products with a bone cover wrap to minimize puncture by exposed sharp bone portions, is surprisingly discovered.

The method and wrap product of the present disclosure is a self-adhesive protective wrap that militates against puncture by exposed bone while also adhering to a subsequently applied bag that militates against leakage. The method for packaging bone-in meat products using a self-adhesive wrap product also provides a protective shield against abrasion during shipping or transportation of meat products.

In an exemplary embodiment, the method for packaging bone-in meat products includes providing a bonded, non-woven polypropylene that is impregnated with a wax formulation. These two components together are hydrophobic, strong, flexible, and self-adhesive to the bone-in meat product as well as to a subsequently applied shrink wrap material inner surface. The bone cover wrap does not melt when exposed to temperatures associated with shrink wrapping.

The wax formulation further creates a sealing barrier to outside conditions and, and is intended to contact and adhere both to itself when wrapped about the perimeter of a bone-in meat cut, and to adhere to a plastic shrink wrap sheet or bag material subsequently applied to the bone wrap. The hydrophobic properties of the polypropylene and the wax formulation mean that meat moisture is better retained, which reduces bag leaks from the subsequently applied standard meat packaging shrink wrap components enclosing the bone cover wrap. In particular embodiments, the impregnation of the wax formulation can also form both adhesive and hydrophobic wax layers on both sides of the non-woven polypropylene.

In one embodiment, a method for packaging bone-in meat products uses a self-adhesive wrap that includes a non-woven polypropylene material layer impregnated with a wax formulation. The wax formulation includes microcrystalline wax—89%; paraffin wax—10%; and polypropylene glycol—1%.

In another embodiment, a method for manufacturing a self-adhesive wrap product includes a step of immersing a non-woven polypropylene material layer in a heated bath of a wax formulation. The wax formulation is caused to impregnate the non-woven material layer and form an impregnated non-woven material layer. The impregnated non-woven material layer is then removed from the heated bath. An excess amount of the wax formulation is next removed from outer surfaces of the impregnated non-woven material layer. The impregnated non-woven material layer is subsequently cooled, and at least one of cut and perforated to form the self-adhesive wrap product.

In an additional embodiment, a method for packaging bone-in meat products includes wrapping substantially all of the meat product with the self-adhesive bone cover wrap such that the bone cover wrap contacts itself to seal about the meat product.

DRAWINGS

The above, as well as other advantages of the present disclosure, will become readily apparent to those skilled in the art from the following detailed description, particularly when considered in the light of the drawings described hereafter, in which:

FIG. 2 is a fragmentary cross-sectional side elevational view of the self-adhesive bone cover wrap taken along section line 2-2 in FIG. 1;

FIG. 3 is a cross-sectional side elevational view of the self-adhesive bone cover wrap depicted in FIG. 1, and further shown wrapped around and sealing a bone-in product and further contained in a shrink or vacuum bag;

DETAILED DESCRIPTION

Figure 1:
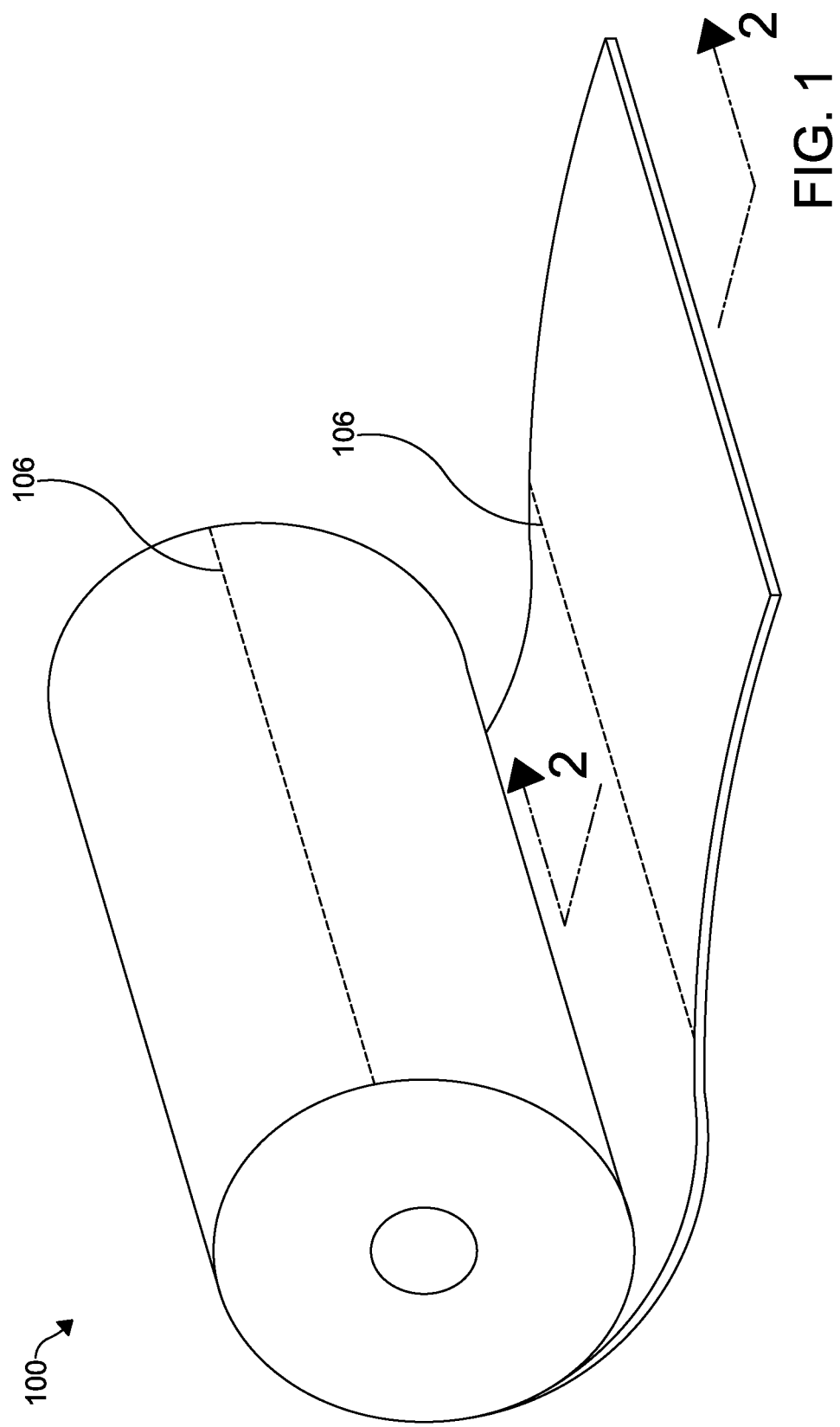
FIG. 1 is a perspective view of a self-adhesive bone cover wrap according to one embodiment of the present disclosure, the self-adhesive bone cover wrap provided on a roll.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical unless otherwise disclosed.

The present disclosure includes a method for packaging bone-in meat products using a self-adhesive bone cover wrap 100 providing resistance to puncture and applied to the meat products to include covering exposed bone. As shown in FIG. 1, the self-adhesive bone cover wrap 100 includes a non-woven material layer 102. The non-woven material layer 102 is a polymeric material made from long fibers or filaments, which are entangled and bonded together by at least one of chemical, mechanical, heat, or solvent treatment. The polymeric material layer 102 is hydrophobic, and has a porosity that permits an impregnation thereof with a wax formulation which will be described in greater detail further herein.

In particular embodiments, the polymeric material layer 102 is formed from synthetic fibers such as polypropylene. A pattern of the synthetic fibers may be selected to improve the permeability and maximize wax impregnation of the polypropylene material. In a most particular embodiment, the polypropylene material has a weight of approximately 1.33 oz./sq. ft., a denier of about 2.75 g per 9000 m, and physical properties as shown below in TABLES 1-4.

TABLE 1

| Physical Property | Minimum | Nominal | Maximum | Units |
|---|---|---|---|---|
| Peak Load | 59 | 70.5 | 83 | N |
| Elongation @ Peak | 57.5 | 69.5 | 81.5 | % |
| Elongation @ Break | 58 | 74 | 90 | % |
| Load @33% Elong | 43 | 51 | 59 | N |
| Tensile Strain @ 10N Elong | 0.25 | 1.5 | 3.25 | % |

ASTM 5025-95, Machine Direction: 50 mm stripe tensile; 75 mm GL; 300 mm/min pull N/50 mm

TABLE 2

| Physical Property | Minimum | Nominal | Maximum | Units |
|---|---|---|---|---|
| Peak Load | 92.5 | 109 | 125.5 | N |
| Elongation @ Peak | 45.5 | 64.5 | 83.5 | % |
| Elongation @ Break | 50.5 | 67 | 83.5 | % |
| Load @33% Elong | 77.5 | 86 | 94.5 | N |
| Tensile Strain @ 10N Elong | 0.5 | 1.0 | 1.5 | % |

ASTM 5025-95, Cross Direction: 50 mm stripe tensile; 75 mm GL; 300 mm/min pull N/50 mm

TABLE 3

| Physical Property | Minimum | Nominal | Maximum | Units |
|---|---|---|---|---|
| Basis Weight | 42 | 44.5 | 47 | gsm |

ASTM D3776, Basis Weight

TABLE 4

| Physical Property | Minimum | Nominal | Maximum | Units |
|---|---|---|---|---|
| Permeability | 300 | 325 | 350 | cfm |

ASTM D737, Air Permeability

The nonwoven polypropylene material having the physical properties has been observed in practice to absorb less wax than prior art nonwoven polypropylene materials. Without being bound to any particular theory, the test data indicates a preferable air permeability of 300-350 cfm, and most preferably an air permeability of about 325 cfm. The lower cfm compared to the prior art can be attributed to a finer fiber denier. The change in tensile compared to the prior art is due primarily to bond pattern. Higher tensile strength is indicative of the higher percentage of bond pattern. Abrasion testing (Martindale Abrasion Test, 10 rotations with pressure of 9 kPa) also shows an improvement relative to the prior art, which helps the bone cover wrap 100 of the disclosure to hold together better during use.

One of ordinary skill in the art may select other suitable polymeric materials, including a different porosity, permeability, and thickness, for the non-woven material layer 102, as desired.

The polypropylene material layer 102 is impregnated with a wax formulation 204. The wax formulation 104 is specially formulated to militate against a transfer of liquid such as water, water vapor, blood, or various liquids present in meat products, from one side of the polypropylene material layer 102 to the other side of the polypropylene material layer 102.

In a most particular embodiment, the wax formulation 104 of the present disclosure includes microcrystalline wax, propylene glycol, and paraffin wax. The microcrystalline wax is a food grade wax, for example. The microcrystalline wax adds body to the wax formulation 104, and behaves as a tackifying agent. The microcrystalline wax causes the self-adhesive bone cover wrap 100 to stick to meat products and to itself when wrapped. The microcrystalline wax may be used in an amount up to about 89% by weight relative to the total weight of the wax formulation, for example.

The paraffin wax in the wax formulation 104 reduces the wax formulation viscosity, and is also hydrophobic, and therefor behaves as a water shielding agent. The concentration of the paraffin wax in the wax formulation 104 may be up to about 10% by weight relative to the total weight of the wax formulation, for example.

The wax formulation 104 further includes polypropylene glycol in amount up to about 1% by weight relative to the total weight of the wax formulation. The propylene glycol may also be food grade. In particular, the polypropylene glycol acts as an agent to disperse water and provides anti-microbial effects.

In a most particular embodiment, the wax formulation 104 has an admixture composition substantially as shown in TABLE 5.

TABLE 5

| Ingredient | Weight Percent |
|---|---|
| Microcrystalline wax | 89% |
| Paraffin wax | 10% |
| Polypropylene glycol | 1% |

The wax formulation 104 may account for between about 50% and about 90% of the self-adhesive bone cover wrap 100, by weight relative to the total weight of the self-adhesive bone cover wrap 100 including the non-woven material layer 102. In a particular embodiment, the wax formulation 104 accounts for approximately 73% of the self-adhesive bone cover wrap 100, by weight relative to the total weight of the self-adhesive bone cover wrap 100 including the non-woven material layer 102. One of ordinary skill in the art may selective other relative weights for the wax formulation 104 and the non-woven material layer 102, as desired.

It should be understood that a skilled artisan may also use other suitable ingredients, as well as adjust the weight percentages of the wax formulation 104 as necessary to account for the addition of the suitable ingredients, within the scope of the present disclosure. For example, one skilled the field may adjust the weight percentages of ingredients in the wax formulation 104 for desired tack of material and moldability.

Together, the non-woven material layer 102 and the impregnated wax formulation 104 defining the bone cover wrap 100 of the present disclosure have a nominal thickness of between 10 mils and 16 mils, and particularly about 13 mils. Other suitable thicknesses for the bone cover wrap 100 may also be selected, as desired.

In operation, at least a portion of, and according to several embodiments the entirety of a bone-in meat product 108 (shown in FIG. 3) is wrapped with the self-adhesive bone cover wrap 100, as described hereinabove. The self-adhesive bone cover wrap 100 adheres to itself when overlapped about the bone-in meat product 108, without requiring any further treatment or adhesives. The self-adhesive bone cover wrap 100 militates against leakage of liquid such as blood or water, which are naturally present in the bone-in meat product 108, from leaking out through the bone cover wrap 100.

Figure 4:
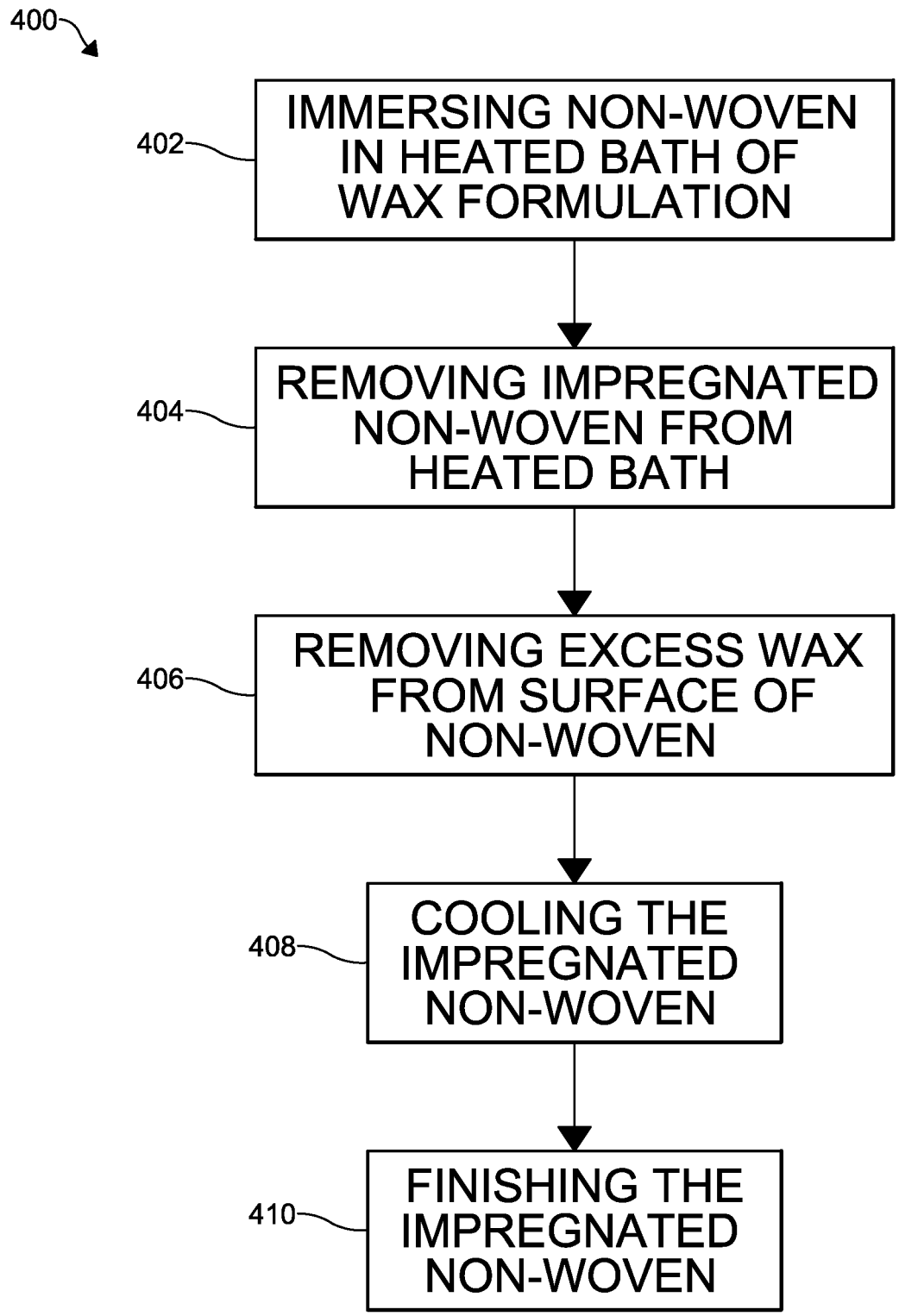
FIG. 4 is a diagram of a method for manufacturing the self-adhesive bone cover wrap shown in FIG. 1.
Figure 5:
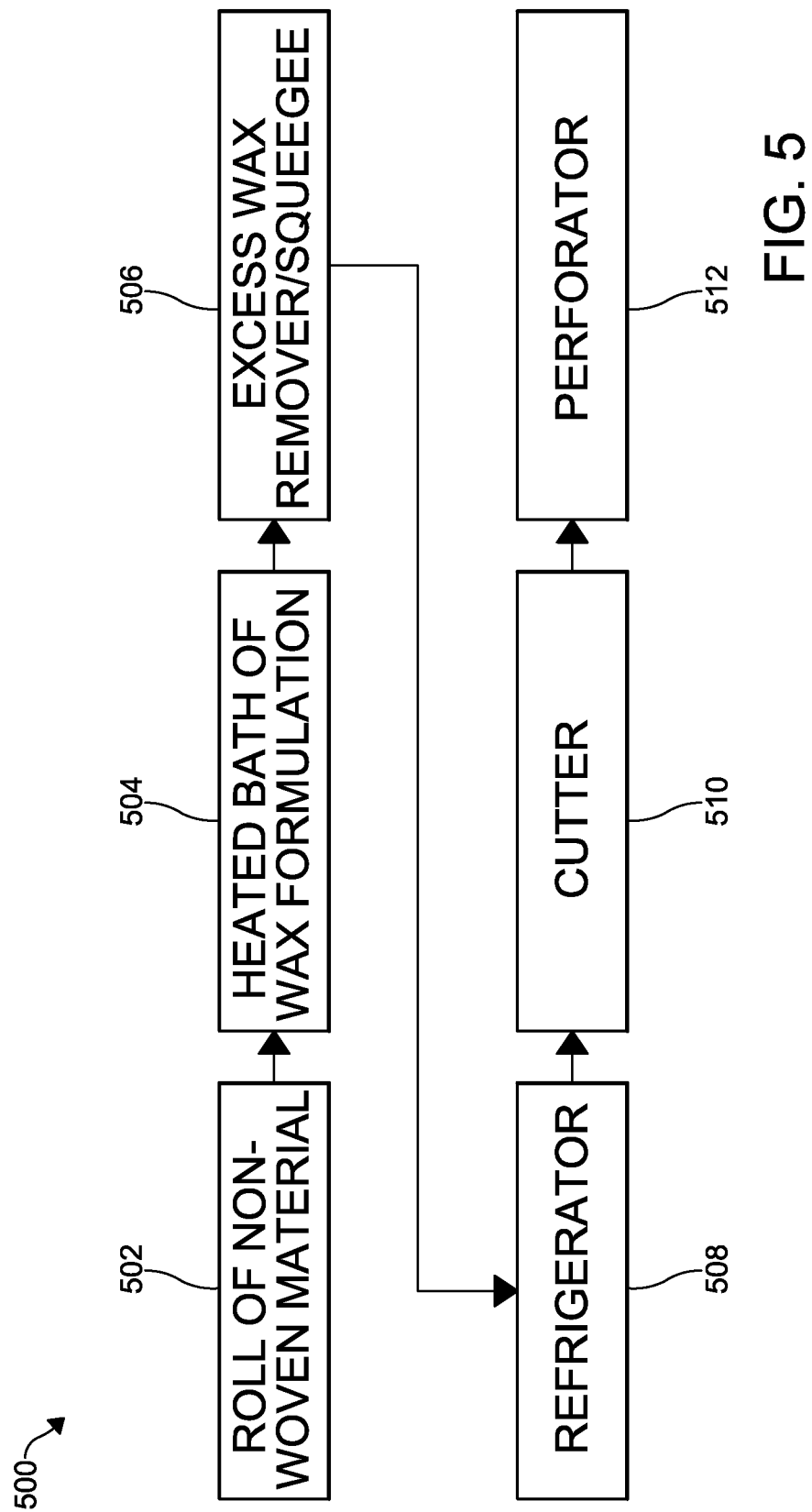
FIG. 5 is a diagram of a system for manufacturing the self-adhesive bone cover wrap shown in FIG. 1.

The present disclosure further includes a method 400 and system 500 for manufacturing the self-adhesive bone cover wrap 100, for example, as shown in FIGS. 4 and 5, respectively. The method 400 for manufacturing the self-adhesive bone cover wrap 100 may be a continuous or a batch process, as desired. According to several embodiments, an exemplary roll 502 of the non-woven material layer 102 (for example, a polypropylene sheeting) of 300 foot length weighs approximately 2.5 pounds, and including the wax coating weighs approximately 9.25 pounds.

The method 400 of coating the non-woven material layer 102 with the wax coating can include a step 402 of immersing the non-woven material layer 102 in a heated bath 504 of the wax formulation 104 described hereinabove. The source of the non-woven material layer 102 may be in the form of a roll 502 of material, which is unrolled and pulled through the heated bath, for example. When in the heated bath 504, the wax formulation 104 is caused to impregnate the non-woven material layer 102 and form an impregnated non-woven material layer.

The temperature of the heated bath 504 is sufficient to lower the viscosity of the wax formulation 104 to a point that facilitates the wax impregnation process. In a particular embodiment, the temperature at which the wax formulation is maintained is about 180° F. One of ordinary skill in the art may select other suitable temperatures for the heated bath 504, as desired.

Following the impregnation process, the wax impregnated non-woven material layer 102 is removed from the heated bath 504 in a step 404. An excess amount of the wax formulation 104 is then removed from outer surfaces of the impregnated non-woven material layer in a step 406. Even with removal of excess material, it should be appreciated that layers of wax remain on the outer surfaces of the non-woven material 102, for example, as shown in FIG. 1. The existence of the wax layers facilitate the self-adhesion of the bone cover wrap 100 to itself, adhesion to the bone-in meat product 108, and adhesion to a subsequently applied shrink or vacuum wrap layer 110 (shown in FIG. 3) of polymeric material which completes the wrapping process.

In a particular embodiment, the excess amount of the wax formulation 104 may be removed with a squeegee 506. The device for removing the excess wax material may be configured to simultaneous remove excess wax from both the upper and lower surfaces of the impregnated non-woven material layer 102, for example. Other types of systems for removing the excess amount of the wax formulation 104 are contemplated and considered within the scope of the present disclosure.

With renewed reference to FIG. 4, upon removing any excess amount of the wax formulation 104 from the surfaces of the non-woven material layer 102, the wax impregnated polypropylene material is cooled to a predetermined temperature in a step 408. For example, the impregnated non-woven material layer 102 may be run through a refrigerator 508 that cools the impregnated non-woven material to a temperature that facilitates a handling of the impregnated non-woven material. The predetermined temperature may be approximately room temperature, as a nonlimiting example. A skilled artisan can select any suitable temperature to which to cool the wax impregnated non-woven material layer 102, as desired.

Subsequent to the cooling of the wax impregnated polypropylene material, the wax impregnated polypropylene material is then cut to form the self-adhesive bone cover wrap 100, in a step 410. Using a cutter 510, lateral cuts can be made with a knife, and the wax impregnated non-woven material layer 102 can be cut to a predetermine length.

Similarly, using a perforator 512 in step 410, the wax impregnated polypropylene material can also be perforated with a plurality of predetermined holes 106 (shown in FIGS. 1 and 2). The perforation holes 106 may be provided in any predetermined pattern or location, as desired. An end user can then tear along the perforations to create a desired length of the self-adhesive bone cover wrap 100 for a particular application on site.

Advantageously, the self-adhesive bone cover wrap 100 of the present disclosure is easy to both apply and remove. The bone cover wrap 100 is applied externally, for example, to the bone-in meat product 108, overwrapping such that the bone cover wrap 100 contacts the bone-in meat product 108 or otherwise closely abuts the surfaces of the bone-in meat product 108. When overlapped about the bone-in meat product 108, the bone cover wrap 100 adheres to itself to stay in place about the perimeter of the bone-in meat product 108, including at locations where one or more bones may protrude from the bone-in meat product 108.

A known vacuum or shrink wrap covering 110, such as a shrink wrap bag, is then applied over the bone cover wrap 100, with heat then applied to shrink the shrink wrap bag. The wax formulation 104 of the bone cover wrap 100 provides for a "dry stick" between the bone-in meat product 108 and to the shrink wrap material 110. In other words, the bone cover wrap 100 adheres to an inner surface of the shrink wrap material 110. This advantageously allows removal of the bone cover wrap 100 at the same time that the shrink wrap material 110 is removed, for example, in the same operation.

While certain representative embodiments and details have been shown for purposes of illustrating the invention, it will be apparent to those skilled in the art that various changes may be made without departing from the scope of the disclosure, which is further described in the following appended claims.

What is claimed is:

1. A self-adhesive bone cover wrap used for packaging bone-in meat products, comprising:
    a non-woven material layer impregnated with a wax formulation including microcrystalline wax in an amount up to 89% for the purpose of tackifying the wax formulation, polypropylene glycol in an amount up to 1% for the purpose of water dispersion and antimicrobial effects, and paraffin wax
    in an amount up to 10% for the purpose of reducing the viscosity of the wax formulation and water shielding effects,
    wherein all percentages are by weight relative to the total weight of the wax formulation.

2. The self-adhesive bone cover wrap of claim 1, wherein the non-woven material layer is a point bonded, non-woven polypropylene.

3. The self-adhesive bone cover wrap of claim 1, wherein the non-woven material layer has an area density of about 1.33 oz./sq. ft.

4. The self-adhesive bone cover wrap of claim 1, wherein the non-woven material layer has an air permeability between 300 cfm and 350 cfm.

5. The self-adhesive bone cover wrap of claim 4, wherein the non-woven material layer has the air permeability of about 325 cfm.

6. The self-adhesive bone cover wrap of claim 1, wherein the non-woven material layer has a basis weight between 42 gsm and 47 gsm.

7. The self-adhesive bone cover wrap of claim 6, wherein the non-woven material layer has the basis weight of about 44.5 gsm.

8. The self-adhesive bone cover wrap of claim 1, wherein the non-woven material has a peak load tensile strength in a machine direction between 59 N and 83 N.

9. The self-adhesive bone cover wrap of claim 8, wherein the non-woven material has the peak load tensile strength of about 70.5 N.

10. The self-adhesive bone cover wrap of claim 1, wherein the microcrystalline wax is present in the wax formulation in an amount of 89% by weight relative to the total weight of the wax formulation.

11. The self-adhesive bone cover wrap of claim 1, wherein the polypropylene glycol is present in the wax formulation in an amount of 1% by weight relative to the total weight of the wax formulation.

12. The self-adhesive bone cover wrap of claim 1, wherein the wax formulation is present in an amount between about 50% and about 90% of the self-adhesive wrap product, by weight relative to the total weight of the self-adhesive wrap product.

13. The self-adhesive bone cover wrap of claim 12, wherein the wax formulation is present in an amount of approximately 73% of the self-adhesive wrap product, by weight relative to the total weight of the self-adhesive wrap product.

14. The self-adhesive bone cover wrap of claim 1, having a thickness between 10 mils and 16 mils.

15. The self-adhesive bone cover wrap of claim 14, having a thickness of about 13 mils.

16. The self-adhesive bone cover wrap of claim 1, wherein the microcrystalline wax is present in the wax formulation in an amount of 89%, the paraffin wax is present in the wax formulation in an amount of 10%, and the polypropylene glycol is present in the wax formulation in an amount of 1%, wherein all percentages are by weight relative to the total weight of the wax formulation.

17. A self-adhesive bone cover wrap used for packaging bone-in meat products, comprising:
    a non-woven material layer impregnated with a wax formulation consisting of microcrystalline wax, polypropylene glycol, and paraffin wax.

* * * * *